(12) United States Patent
Wei

(10) Patent No.: US 10,492,077 B2
(45) Date of Patent: Nov. 26, 2019

(54) SPECTRUM UPDATE USAGE METHOD AND SYSTEM, AND WHITE SPACE DEVICE

(71) Applicant: Huawei Technologies Co., Ltd., Shenzhen, Guangdong (CN)

(72) Inventor: Xinpeng Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/018,391

(22) Filed: Feb. 8, 2016

(65) Prior Publication Data

US 2016/0157104 A1 Jun. 2, 2016

Related U.S. Application Data

(63) Continuation of application No. PCT/CN2013/081177, filed on Aug. 9, 2013.

(51) Int. Cl.
*H04W 16/14* (2009.01)

(52) U.S. Cl.
CPC .................. *H04W 16/14* (2013.01)

(58) Field of Classification Search
CPC ............. H04W 16/14; H04W 72/0453; H04W 72/082; H04W 88/08; H04W 24/00;
(Continued)

(56) References Cited

U.S. PATENT DOCUMENTS 9,125,216 B1 * 9/2015 Choi .................... H04W 72/082
2001/0021639 A1 * 9/2001 Kaku .................... H04W 52/46
455/41.2

(Continued)

FOREIGN PATENT DOCUMENTS

CN 101478758 A 7/2009
CN 101624465 A 1/2010
(Continued)

OTHER PUBLICATIONS

Hargrave, Frank, Hargrave's Communication Dictionary, 2001, Wiley-IEEE Press, pp. 83 and 88.*
(Continued)

*Primary Examiner* — Matthew C Sams
(74) *Attorney, Agent, or Firm* — Leydig, Voit & Mayer, Ltd.

(57) ABSTRACT

The present invention provides a method for updating a white space spectrum, an access device and a communication system, where the method performed by the access device includes: acquiring feature information of a white space spectrum, wherein the white space spectrum is currently used by the access device for communicating with a terminal, and the feature information comprises information about a bandwidth and a central frequency of the white space spectrum; sending an update request that comprises the feature information to a spectrum database device; and communicating with the terminal by using the white space spectrum identified by the feature information when a response for the update request from the spectrum database device indicates that the white space spectrum is available. The present invention optimizes a process of updating a white space spectrum.

15 Claims, 4 Drawing Sheets

(58) Field of Classification Search
CPC .................... H04W 24/10; H04W 28/0231; H04L 5/0066; H04B 7/26
See application file for complete search history.

(56) References Cited

U.S. PATENT DOCUMENTS

| | | | | |
|---|---|---|---|---|
| 2009/0263103 | A1* | 10/2009 | Mae | G11B 27/105 386/248 |
| 2010/0010146 | A1 | 1/2010 | Lee et al. | |
| 2011/0158147 | A1* | 6/2011 | Li | H04W 72/082 370/312 |
| 2011/0287802 | A1* | 11/2011 | Ma | H04L 5/0066 455/517 |
| 2012/0115440 | A1* | 5/2012 | Naito | G06Q 10/00 455/411 |
| 2013/0003591 | A1* | 1/2013 | Novak | H04W 72/085 370/252 |
| 2013/0122933 | A1* | 5/2013 | Lee | H04W 16/14 455/456.2 |
| 2013/0310062 | A1 | 11/2013 | Liu et al. | |
| 2013/0331117 | A1* | 12/2013 | Probasco | H04W 48/04 455/456.1 |
| 2014/0051467 | A1* | 2/2014 | Tan | H04W 16/14 455/501 |
| 2014/0315565 | A1* | 10/2014 | Ihara | H04W 16/14 455/452.1 |
| 2014/0378147 | A1* | 12/2014 | Hassan | H04W 16/14 455/438 |
| 2015/0163080 | A1 | 6/2015 | Li et al. | |
| 2015/0382151 | A1* | 12/2015 | Pariani | H04W 4/04 455/456.3 |
| 2015/0382201 | A1* | 12/2015 | Chou | H04W 36/14 370/329 |

FOREIGN PATENT DOCUMENTS

| | | |
|---|---|---|
| CN | 102355671 A | 2/2012 |
| CN | 102595420 A | 7/2012 |
| CN | 102624465 A | 8/2012 |
| WO | 2012151996 A1 | 11/2012 |

OTHER PUBLICATIONS

V. Chen, Ed. et al., "Protocol to Access Spectrum Database", PAWS Internet-Draft, Feb. 13, 2013, 79 pages.

V. Chen, Ed et al., "Protocol to Access White-Space (PAWS) Databases", Internet Engineering Task Force (IETF), May 2015, 90 pages.

* cited by examiner

SPECTRUM UPDATE USAGE METHOD AND SYSTEM, AND WHITE SPACE DEVICE

CROSS-REFERENCE TO RELATED APPLICATIONS

This application is a continuation of International Application No. PCT/CN2013/081177, filed on Aug. 9, 2013, which is hereby incorporated by reference in its entirety.

TECHNICAL FIELD

The present invention relates to the field of communications technologies, and in particular, to a spectrum update usage method and a spectrum update usage system, and further to a white space device.

BACKGROUND

With rapid development of communications technologies, a quantity of UE (user equipment) such as a mobile phone and a tablet computer is increasing sharply, and what is accompanied is a high demand for bandwidth resources. In the prior art, a white space device such as a Node B (base station) uses a white space to increase bandwidth resources, so as to meet the high demand for bandwidth resources, where the white space may be used in multiple application scenarios, such as a cellular network, a wireless local area network, and broadband access. The white space device generally uses the white space in a manner of querying a database in a spectrum database device.

A spectrum management organization allocates a large quantity of spectrum resources to the wireless application field such as television signal transmission, where the allocated spectrum resources may not be used within a regional range in a time period (some spectra that are not effectively used are white spaces). In this case, a waste of the spectrum resources is caused.

When needing to use a white space resource, the white space device needs to initiate a spectrum usage request to the spectrum database device. The white space device sends geographic location information and the like of the white space device to the spectrum database device; and the spectrum database device allocates an available white space A to the white space device according to the information transmitted by the white space device and spectrum resource information stored and managed by the spectrum database device.

For example, the white space A used by the white space device may be allowed to be used only in a time period, and not be allowed to be used in a next time period; certainly, the same white space A may also be used in several consecutive time periods. However, a mechanism of updating and using the white space by the white space device in the prior art is that, each time when the white space needs to be updated and used, a complete spectrum usage request needs to be performed once again, and one of available white spaces that are received and allocated by the spectrum database device is selected to be configured and used. In addition, the available white spaces allocated by the spectrum database device may only be a part of available white spaces, and not all available white spaces are listed; for example, a case in which the white space A that is currently used by the white space device is omitted exists, which causes that the spectrum database device needs to switch to configuring and using another white space B to work.

It is not hard to see that when the white space device is providing a service such as wireless access for UE by using the white space A, if the white space A is available, but the white space device is forced to switch to configuring and using the white space B to work, updating and using the white space by the white space device may cause a phenomenon such as low service signal quality of the UE or signal interruption, which affects quality of service.

SUMMARY

Embodiments of the present invention mainly resolve a technical problem in the prior art that low service signal quality and signal interruption are caused by updating and using a white space by a white space device.

In view of this, the embodiments of the present invention provide a spectrum update usage method and system, and a white space device, so as to implement intelligentization in a process of updating and using the white space by the white space device, and optimize a spectrum update usage manner, which effectively improves service signal quality of the white space device.

A first aspect of the embodiments of the present invention provides a spectrum update usage method, where the spectrum update usage method includes: acquiring feature information of a current white space when a white space device needs to further use the current white space; and sending query request information that includes the feature information to a spectrum database device, so that the spectrum database device determines whether the current white space corresponding to the feature information is available for further use.

With reference to the first aspect, in a first possible implementation manner, after the sending query request information that includes the feature information to a spectrum database device, the method further includes: receiving response information returned by the spectrum database device according to the query request information; and performing processing according to the response information, so that when the spectrum database device determines that the current white space is available for further use, the current white space is configured and used according to indication information in the response information.

With reference to the first possible implementation manner of the first aspect, in a second possible implementation manner, the feature information includes bandwidth and a central frequency that are of the current white space.

With reference to the first or the second possible implementation manner of the first aspect, in a third possible implementation manner, the step of performing processing according to the response information further includes: when the spectrum database device determines that the current white space is unavailable for further use and determines that another available white space exists, configuring and using the another available white space according to spectrum information that is corresponding to the another available white space and is included in the response information.

With reference to the first or the second possible implementation manner of the first aspect, in a fourth possible implementation manner, the step of performing processing according to the response information further includes: when the spectrum database device determines that the current white space is unavailable for further use and determines that no other available white space exists, stopping, according to unavailability prompt information included in the response information, configuring and using the white space.

With reference to the first aspect, or the first or the second possible implementation manner of the first aspect, in a fifth possible implementation manner, the query request information includes: one or more of following information: a device serial number, a device type, an antenna characteristic, information about a geographic location in which the device is located, device owner information, and device capability information that are corresponding to the white space device.

A second aspect of the embodiments of the present invention provides a white space device, where the white space device includes an acquiring module and a sending module; the acquiring module is configured to acquire feature information of a current white space when the white space device needs to further use the current white space; and the sending module is configured to send query request information that includes the feature information acquired by the acquiring module to a spectrum database device, so that the spectrum database device determines whether the current white space corresponding to the feature information is available for further use.

With reference to the second aspect, in a first possible implementation manner, the white space device further includes a receiving module and a configuration processing module; the receiving module is configured to receive response information returned by the spectrum database device according to the query request information sent by the sending module; and the configuration processing module is configured to perform processing according to the response information received by the receiving module, so that when the spectrum database device determines that the current white space is available for further use, the current white space is configured and used according to indication information in the response information.

With reference to the first possible implementation manner of the second aspect, in a second possible implementation manner, the feature information includes bandwidth and a central frequency that are of the current white space.

With reference to the first or the second possible implementation manner of the second aspect, in a third possible implementation manner, the configuration processing module is further specifically configured to: when the spectrum database device determines that the current white space is unavailable for further use and determines that another available white space exists, configure and use the another available white space according to spectrum information that is corresponding to the another available white space and is included in the response information.

With reference to the first or the second possible implementation manner of the second aspect, in a fourth possible implementation manner, when the spectrum database device determines that the current white space is unavailable for further use and determines that no other available white space exists, configuring and using the white space is stopped according to unavailability prompt information included in the response information.

With reference to the second aspect, or the first or the second possible implementation manner of the second aspect, in a fifth possible implementation manner, the white space device includes a base station and an access device, and the query request information includes one or more of following information: a device serial number, a device type, an antenna characteristic, information about a geographic location in which the device is located, device owner information, and device capability information that are corresponding to the white space device.

A third aspect of the embodiments of the present invention provides a white space device, where the white space device includes a processor and a transmitter; the processor is configured to acquire feature information of a current white space when the white space device needs to further use the current white space; and the transmitter is configured to send query request information that includes the feature information acquired by the processor to a spectrum database device, so that the spectrum database device determines whether the current white space corresponding to the feature information is available for further use.

With reference to the third aspect, in a first possible implementation manner, the white space device further includes a receiver, and the receiver is configured to receive response information returned by the spectrum database device according to the query request information sent by the transmitter, where the processor is further configured to perform processing according to the response information received by the receiver, so that when the spectrum database device determines that the current white space is available for further use, the current white space is configured and used according to indication information in the response information.

With reference to the first possible implementation manner of the third aspect, in a second possible implementation manner, the white space device includes a base station and an access device, the feature information includes bandwidth and a central frequency that are of the current white space, and the processor is further configured to: when the spectrum database device determines that the current white space is unavailable for further use and determines that another available white space exists, configure and use the another available white space according to spectrum information that is corresponding to the another available white space and is included in the response information.

With reference to the first possible implementation manner of the third aspect, in a third possible implementation manner, the processor is further configured to: when the spectrum database device determines that the current white space is unavailable for further use and determines that no other available white space exists, stop, according to unavailability prompt information included in the response information, configuring and using the white space.

A fourth aspect of the embodiments of the present invention provides a spectrum update usage system, where the spectrum update usage system includes a white space device and a spectrum database device; the white space device is configured to: when the white space device needs to further use a current white space, acquire feature information of the current white space, and send query request information that includes the feature information to the spectrum database device; and the spectrum database device is configured to: determine whether the current white space corresponding to the feature information is available for further use, generate response information according to the query request information, and send the response information to the white space device.

With reference to the fourth aspect, in a first possible implementation manner, the white space device is further configured to perform processing according to the response information, so that when the spectrum database device determines that the current white space is available for further use, the current white space is configured and used according to indication information in the response information.

With reference to the first possible implementation manner of the fourth aspect, in a second possible implementation manner, the white space device includes a base station and an access device, and the feature information includes bandwidth and a central frequency that are of the current white space.

With reference to the first or the second possible implementation manner of the fourth aspect, in a third possible implementation manner, the white space device is further configured to: when the spectrum database device determines that the current white space is unavailable for further use and determines that another available white space exists, configure and use the another available white space according to spectrum information that is corresponding to the another available white space and is included in the response information.

With reference to the first or the second possible implementation manner of the fourth aspect, in a fourth possible implementation manner, the white space device is further configured to: when the spectrum database device determines that the current white space is unavailable for further use and determines that no other available white space exists, stop, according to unavailability prompt information included in the response information, configuring and using the white space.

With reference to the fourth aspect, or the first or the second possible implementation manner of the fourth aspect, in a fifth possible implementation manner, the query request information includes one or more of following information: a device serial number, a device type, an antenna characteristic, information about a geographic location in which the device is located, device owner information, and device capability information that are corresponding to the white space device, and the white space device is configured to provide a radio access service for a mobile phone, a tablet computer, a palmtop computer, a wireless microphone, or a walkie-talkie by configuring and using the white space.

In the present invention, the technical solutions provided by the embodiments of the present invention are used. Before performing spectrum update usage, a white space device may acquire in advance feature information of a current white space that is currently used, and send the feature information to a spectrum database device, so that when querying a white space that is stored and managed, the spectrum database device can determine whether a specified white space corresponding to the feature information is available for further use by the white space device, thereby effectively avoiding a case in which the white space device needs to switch to using a different white space, where the case may be caused due to that the spectrum database device randomly returns an available white space. In addition, in the embodiments of the present invention, the white space device may be allowed to preferentially use the current white space during spectrum update usage and does not need to perform switching, thereby effectively implementing intelligentization in a process of updating and using the white space by the white space device, optimizing a spectrum update usage manner, improving service signal quality of the white space device, and further ensuring working and quality of service of UE.

DETAILED DESCRIPTION

Figure 1:
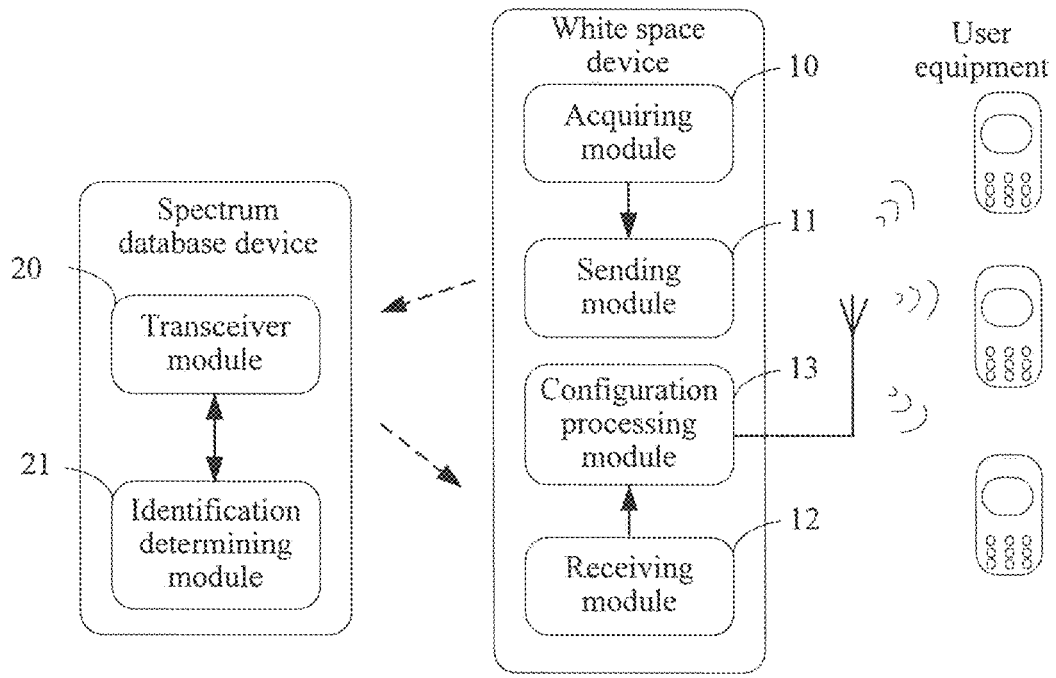
FIG. 1 is a schematic diagram of a function module of an embodiment of a spectrum update usage system according to an embodiment of the present invention.

In the following description, to illustrate rather than limit, specific details such as a particular system structure, an interface, and a technology are provided to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

Various aspects are described in this specification with reference to user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

The base station (for example, an access point) may refer to a device in communication with a wireless terminal via one or more sectors at an air interface in an access network. The base station may be used for mutually converting a received over-the-air frame and an IP packet and serve as a router between the wireless terminal and a rest portion of the access network, where the rest portion of the access network may include an Internet Protocol (IP) network. The base station may also coordinate attribute management of the air interface.

For example, the base station may be a base station controller (BSC) in a 2G network, a radio network controller (RNC) in a 3G network, or an evolved NodeB (eNodeB) in an LTE network. For example, the base station may be a base station (BTS, Base Transceiver Station) in GSM or CDMA, may be a base station (NodeB) in WCDMA, or may be an evolved NodeB (NodeB, eNB, or e-NodeB, evolutional Node B) in LTE, which is not limited in the present invention.

The base station controller may be a base station controller (BSC) in GSM or CDMA, or a radio network controller (RNC) in WCDMA, which is not limited in the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Referring to FIG. 1, FIG. 1 is a schematic diagram of a function module of an embodiment of a spectrum update usage system according to an embodiment of the present invention. In this embodiment, the spectrum update usage system includes but is not limited to a white space device and a spectrum database device.

It should be noted that the white space device may be configured to provide, by configuring and using a white space, a wireless access service for user equipment such as a mobile phone, a tablet computer, a palmtop computer, a wireless microphone, and/or a walkie talkie that may work, provide a service, or the like by using a wireless connection. Correspondingly, the white space device in this embodiment may be a device, such as a base station or an AP (Access Point, access device), that can provide a wireless access service; for example, a cellular network, a wireless local area network, or broadband access is established by using the wireless access service. The spectrum database device may be a large or giant computer device managed by a spectrum management organization of a country or a region, or may be a virtual device or the like, which is not limited herein.

Specifically, the white space device may include an acquiring module 10, a sending module 11, a receiving module 12, and a configuration processing module 13; the spectrum database device may include a transceiver module 20 and an identification determining module 21.

The acquiring module 10 is configured to acquire feature information of a current white space when the white space device needs to further use the current white space. It is not hard to see that a spectrum resource allocated by the spectrum management organization for television signal transmission or the like may be used in a time period within a regional range, and in a next or another time period, the spectrum resource may be re-allocated for the television signal transmission or the like for instant use. Therefore, the white space device cannot occupy a white space in the long term, and in this case, the white space device performs white space querying on the spectrum database device regularly or irregularly, so as to obtain a white space that is allowed (that is, authorized) to be used to work. Specifically, when the white space device is a base station or an AP, the acquiring module 10 acquires bandwidth and a central frequency that are of a current white space currently used by the base station or the AP to provide the wireless access service or the like to serve as feature information, or certainly, may acquire transmit power or other more features of the current white space to serve as feature information, which is not limited herein.

It should be noted that, the acquiring module 10 may be set by default to automatically acquire the feature information each time when white space querying needs to be performed on the spectrum database device; or the acquiring module 10 may automatically choose, according to a current operating status of the white space device, whether to acquire the feature information; for example, if the operating status of the white space device is good (for example, there is sufficient bandwidth between the white space device and the spectrum database device and/or a signal connection therebetween is stable), and a case such as congestion or operating speed reduction is not caused due to that the spectrum database device returns a large quantity of redundancy information, the acquiring module 10 determines that the feature information does not need to be acquired. Further, if a quantity of UE that uses a wireless service provided by the white space device is relatively small in some time periods (such as, from 3 to 5 a.m.), and usage operations, such as communication and accessing a network, performed by the UE are not affected when the white space device updates and uses the white space and switches to using another white space, the acquiring module 10 may also determine, according to the time periods, that the feature information does not need to be acquired.

The sending module 11 is configured to send query request information that includes the feature information acquired by the acquiring module 10 to the transceiver module 20. The query request information may only include the feature information, or may include specific information corresponding to the white space device, such as a device serial number, a device type, a usage time period, required bandwidth, and/or a transmission distance. Specifically, the sending module 11 may perform choosing according to whether there is sufficient bandwidth between a current white space device and the spectrum database device, whether a signal connection therebetween is stable, and/or the like; for example, if there is no sufficient bandwidth, an amount of data in the query request information is reduced as far as possible, and if there is sufficient bandwidth, the amount of the data in the query request information may be increased. It should be understood that, in this embodiment, on the premise that performance stability is ensured and normal working is not affected, the amount of the data in the query request information may be intelligently set, which is not described in detail herein.

The identification determining module 21 determines whether the current white space corresponding to the feature information received by the transceiver module 20 is available for further use, generates response information according to the query request information, and further sends the response information to the receiving module 12 by using the transceiver module 20. It should be noted that, the identification determining module 21 obtains a determining result after determining whether the current white space is available for further use, and generates the response information according to the determining result, where the determining result may include "the current white space is available for further use and it is determined that another available white space exists", "the current white space is available for further use and it is determined that no other available white space exists", "the current white space is unavailable for further use and it is determined that another available white space exists", "the current white space is unavailable for further use and it is determined that no other available white space exists", or the like. Correspondingly, when the determining result is "the current white space is available for further use and it is determined that another available white space exists" or "the current white space is available for further use and it is determined that no other available white space exists", the response information may include indication information (such as "available", "YES", or "allowed") corresponding to the current white space; when the determining result is "the current white space is unavailable for further use and it is determined that another available white space exists", the response information may include spectrum information (such as "unavailable, and whether to perform switching", "NO, and whether to perform switching", or "a white space allowed to be used is ABC") corresponding to the another available white space; when the determining result is "the current white space is unavailable for further use and it is determined that no other available white space exists", the response information may include unavailability prompt information (that is, there is no available white space), or the like. The response information may also include a list of effective white spaces and effective time of the white spaces for the white space device to perform intelligent and automatic choosing, which is not described in detail herein.

The configuration processing module 13 is configured to perform corresponding processing according to the response information received by the receiving module 12. Specifically, the configuration processing module 13 may perform processing according to indication information (such as "available", "YES", or "allowed", "available, and whether to further use?") that is corresponding to the current white space and is included in the response information, spectrum information (such as "unavailable, and whether to perform switching", "NO, and whether to perform switching", or "a white space allowed to be used includes ABC") corresponding to the another available white space, the unavailability prompt information (that is, there is no available white space), or the like. It should be noted that, the "corresponding processing" may include that when the identification determining module 21 determines that the current white space is available for further use (for example, "available", "YES", or "allowed"), the configuration processing module 13 configures and uses the current white space according to the indication information that is corresponding to the current white space and is included in the response information; the "corresponding processing" may be that the configuration processing module 13 switches to using another available white space in the case of "unavailable, and whether to perform switching", "NO, and whether to perform switching", or "a white space allowed to be used is ABC"; or the "corresponding processing" may be that standby is performed in the case of the unavailability prompt information (that is, there is no available white space), and in a preset time period (such as an update cycle), the white space device performs again a process such as spectrum querying on the spectrum database device, which is not limited herein.

It should be noted that, after the identification determining module 21 in this embodiment performs determining, if the determining result includes "the current white space is available for further use", the indication information (such as "available", "YES", or "allowed") and the like to be returned in the response information needs to be specified, so that the configuration processing module 13 further preferably configures and uses the current white space according to the indication information. In this manner, this embodiment can effectively avoid a case in which query conditions are the same, but white space lists obtained by two queries are different, where the case is caused due to that the white space device uses an existing update usage method. When the configuration processing module 13 determines that the current white space is available for further use, a process of the "configuring and using" may be re-activating, configuring, and using the current white space, or may be keeping a current operating status of the white space device without performing processes such as activation and configuration, which further ensures that a case such as interruption or pulse interference does not occur when the UE uses the wireless service.

It is not hard to understand that, before performing spectrum update usage, the white space device in this embodiment may acquire in advance feature information of a current white space that is currently used, and send the feature information to the spectrum database device, so that when querying a white space that is stored and managed, the spectrum database device can determine whether a specified white space corresponding to the feature information is available for further use by the white space device, thereby effectively avoiding a case in which the white space device needs to switch to using a different white space, where the case may be caused due to that the spectrum database device randomly returns an available white space.

According to this embodiment, a white space device may be allowed to preferentially use a current white space during spectrum update usage without performing switching, thereby effectively implementing intelligentization in a process of updating and using the white space by the white space device, optimizing a spectrum update usage manner, effectively improving service signal quality of the white space device, and further ensuring working and quality of service of UE.

Figure 2:
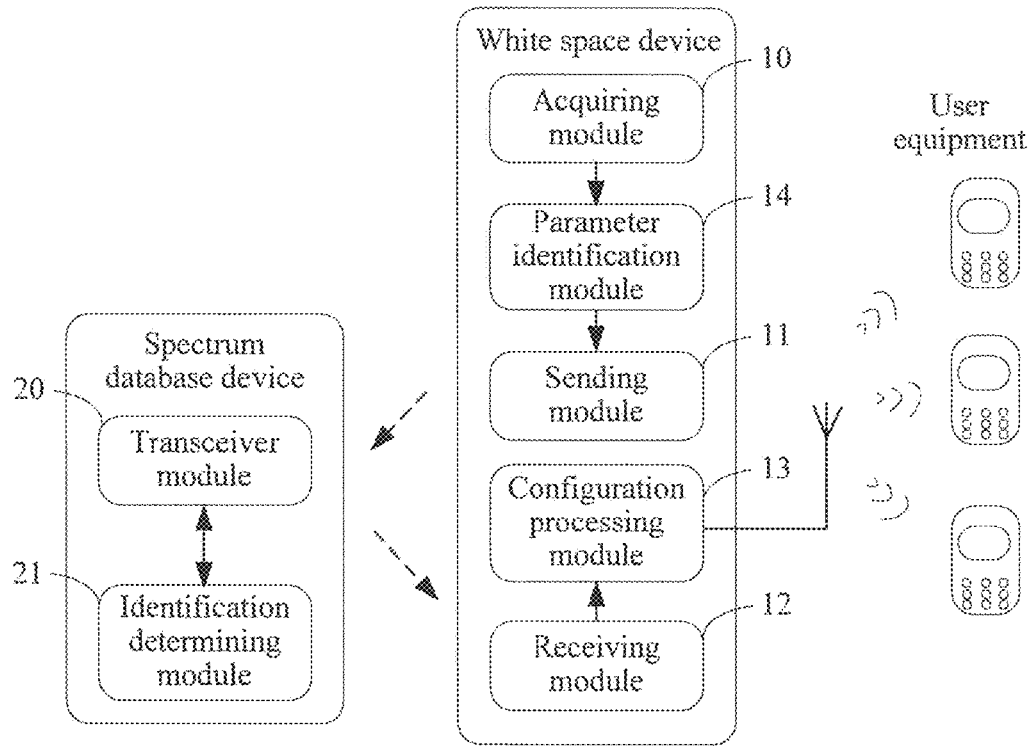
FIG. 2 is a schematic diagram of a function module of another embodiment of a spectrum update usage system according to an embodiment of the present invention.

Referring to FIG. 2, FIG. 2 is a schematic diagram of a function module of another embodiment of a spectrum update usage system according to an embodiment of the present invention. In this embodiment, the spectrum update usage system includes but is not limited to a white space device and a spectrum database device.

It should be noted that the white space device may be configured to provide, by configuring and using a white space, a wireless access service or the like for user equipment such as a mobile phone, a tablet computer, a palmtop computer, a wireless microphone, and/or a walkie talkie that may work, provide a service, or the like by using a wireless connection. Correspondingly, the white space device in this embodiment may be a device, such as a base station or an AP, that can provide a wireless access service, and the spectrum database device may be a physical device, a virtual device, or the like managed by a spectrum management organization of a country or a region, which is not limited herein.

Specifically, the white space device may include an acquiring module 10, a sending module 11, a receiving module 12, a configuration processing module 13, and a parameter identification module 14; the spectrum database device may include a transceiver module 20 and an identification determining module 21.

The acquiring module 10 is configured to acquire feature information of a current white space when the white space device needs to further use the current white space. It is not hard to see that a spectrum resource allocated by the spectrum management organization for television signal transmission or the like may be used in a time period within a regional range, and in a next or another time period, the spectrum resource may be re-allocated for the television signal transmission or the like for instant use. Therefore, the white space device cannot occupy a white space in the long term, and in this case, the white space device performs white space querying on the spectrum database device regularly or irregularly, so as to obtain a white space that is allowed (that is, authorized) to be used to work. Specifically, when the white space device is a base station or an AP, the acquiring module 10 acquires bandwidth and a central frequency that are of a current white space currently used by the base station or the AP to provide the wireless access service or the like to serve as feature information, or may acquire bandwidth, a central frequency, and transmit power to serve as feature information, which is not limited within a range in which a person skilled in the art can understand.

As described above, the acquiring module 10 may be set by default to automatically acquire the feature information each time when white space querying needs to be performed on the spectrum database device; or the acquiring module 10 may automatically choose, according to a current operating status of the white space device, whether to acquire the feature information; for example, if the operating status of the white space device is good (for example, there is sufficient bandwidth between the white space device and the spectrum database device and/or a signal connection therebetween is stable), and a case such as congestion or operating speed reduction is not caused due to that the spectrum database device returns a large quantity of redundancy information, the acquiring module 10 determines that the feature information does not need to be acquired. Further, if a quantity of UEs that use a wireless service provided by the white space device is relatively small in some time periods (such as from 3 to 5 a.m.), and usage operations, such as communication and accessing a network, performed by the UE are not affected when the white space device updates and uses the white space and switches to using another white space, the acquiring module 10 may also determine, according to the time periods, that the feature information does not need to be acquired.

The parameter identification module 14 is configured to combine the feature information and a predetermined character string, that is, may combine the feature information and the predetermined character string into a field that can be read and identified and is used for determining, where the predetermined character string may be preferred_ws, for_ws, or the like, which is not limited herein, as long as the predetermined character string can be identified by the spectrum database device. For ease of understanding, a character string that includes ws (white space) is preferably used in this embodiment.

The sending module 11 is configured to send query request information that includes the feature information acquired by the acquiring module 10 to the transceiver module 20. Specifically, the sending module 11 may be further configured to send the query request information that includes at least one of a device serial number, a device type, an antenna characteristic, information about a geographic location in which the device is located, device owner information, and device capability information that are corresponding to the white space device to the transceiver module 20. For example, the sending module 11 may send the device serial number and the device type, or a combination of any two, three, or more, which is not limited herein.

Specifically, the sending module 11 may also perform choosing according to whether there is sufficient bandwidth between a current white space device and the spectrum database device, whether a signal connection therebetween is stable, and/or the like; for example, if there is no sufficient bandwidth, an amount of data in the query request information is reduced as far as possible, and if there is sufficient bandwidth, the amount of the data in the query request information may be increased. It should be understood that, in this embodiment, on the premise that performance stability is ensured and normal working is not affected, the amount of the data in the query request information may be intelligently set, which is not described in detail herein. What is corresponding to the parameter identification module 14 is that, the sending module 11 is specifically configured to send the query request information to the transceiver module 20 after the parameter identification module 14 combines the feature information and the predetermined character string into the field, where a character string of the query request information may include AVAIL_SPECTRUM_REQ.

It should be noted that, the white space device may perform white space querying on the spectrum database device by using the PAWS protocol (Protocol to Access WS database).

The identification determining module 21 determines whether the current white space corresponding to the feature information received by the transceiver module 20 is available for further use, generates response information according to the query request information, and further sends the response information to the receiving module 12 by using the transceiver module 20.

It should be noted that, the identification determining module 21 needs to identify the feature information according to the predetermined character string, then determine, according to the feature information and a white space database of the identification determining module 21, whether the current white space corresponding to the feature information is available for further use, so as to obtain a determining result. That is, in the spectrum database device, the predetermined character string needs to be registered and defined first, for example, preferred_ws or the like is registered and defined in advance. When identifying and reading a field that includes the predetermined character string preferred_ws in query request information of AVAIL_SPECTRUM_REQ, the spectrum database device may determine that a white space that is corresponding to the feature information carried in the field is a currently used white space that the white space device needs to request for further use, and then determine, by using the identification determining module 21, whether the white space is available for further use.

As described above, the identification determining module 21 obtains a determining result after determining whether the current white space is available for further use, and generates the response information according to the determining result, where the determining result may include "the current white space is available for further use and it is determined that another available white space exists", "the current white space is available for further use and it is determined that no other available white space exists", "the current white space is unavailable for further use and it is determined that another available white space exists", or "the current white space is unavailable for further use and it is determined that no other available white space exists". Correspondingly, the response information may be information about a white space allocated to the white space device by using a corresponding algorithm. Specifically, when the determining result is "the current white space is available for further use and it is determined that another available white space exists" or "the current white space is available for further use and it is determined that no other available white space exists", the response information may include indication information (such as "available", "YES", or "allowed") corresponding to the current white space; when the determining result is "the current white space is unavailable for further use and it is determined that another available white space exists", the response information may include spectrum information (such as "unavailable, and whether to perform switching", "NO, and whether to perform switching", or "a white space allowed to be used is ABC") corresponding to the another available white space; when the determining result is "the current white space is unavailable for further use and it is determined that no other available white space exists", the response information may include unavailability prompt information (that is, there is no available white space), or the like, which is not described in detail herein.

The configuration processing module 13 is configured to perform corresponding processing according to the response information received by the receiving module 12. Specifically, the configuration processing module 13 may configure and use the current white space according to indication information (such as "available", "YES", or "allowed") that is corresponding to the current white space and is included in the response information; switch to using another available white space according to spectrum information (such as "unavailable, and whether to perform switching", "NO, and whether to perform switching", or "a white space allowed to be used includes ABC") corresponding to the another available white space; or perform standby according to the unavailability prompt information (that is, there is no available white space); in a preset time period (such as an update cycle), the white space device performs again a processing process such as spectrum querying on the spectrum database device. It should be noted that, when the identification determining module 21 determines that the current white space is available for further use, the configuration processing module 13 preferably configures and uses the current white space according to the indication information that is corresponding to the current white space and is included in the response information.

It should be noted that, after the identification determining module 21 in this embodiment performs determining, if the determining result includes "the current white space is available for further use", the indication information (such as "available", "YES", or "allowed") and the like to be returned in the response information needs to be specified, so that the configuration processing module 13 further preferably configures and uses the current white space according to the indication information. When the configuration processing module 13 determines that the current white space is available for further use, a process of the "configuring and using" may be re-activating, configuring, and using the current white space, or may be keeping a current operating status of the white space device without performing processes such as activation and configuration, which further ensures that a case such as interruption or pulse interference does not occur when the UE uses the wireless service. In addition, when the identification determining module 21 determines that the current white space is unavailable for further use and determines that another available white space exists, the configuration processing module 13 is further configured to configure and use the another available white space according to spectrum information that is corresponding to the another available white space and is included in the response information; when the identification determining module 21 determines that the current white space is unavailable for further use and determines that no other available white space exists, the configuration processing module 13 is further configured to stop, according to the unavailability prompt information included in the response information, configuring and using the white space.

Further, in order to avoid transmission of a large quantity of redundancy information between the white space device and the spectrum database device, when determining that the field that includes the predetermined character string and the feature information exists in the query request information, the spectrum database device in this embodiment may only return indication information related to the current white space, for example, return, to the white space device, at least one of the bandwidth and the central frequency that are of the current white space, or at least one of bandwidth, a central frequency, and transmit power that are of a set using the current white space as a subset. It is not hard to see that, in this setting manner, the spectrum database device may be prevented from sending information about another unrelated available white space to the white space device, and only transmits effective response information, thereby improving working performance.

When the configuration processing module 13 determines that the at least one of the bandwidth and the central frequency that are of the current white space exists in the response information, or the at least one of the bandwidth and the central frequency that are of the current white space is included in at least one of bandwidth and a central frequency that are returned in the response information, it is considered by default that the configuration processing module 13 may further use the current white space, so as to perform related processing.

The white space device in this embodiment acquires feature information of a current white space that is currently used, and sends the feature information to the spectrum database device, so that when querying a white space that is stored and managed, the spectrum database device can determine whether a white space specified in the feature information included in a predetermined character string is available for further use by the white space device, thereby effectively avoiding a case in which the white space device needs to switch to using a different white space, where the case may be caused due to that the spectrum database device randomly returns an available white space.

According to the present invention, a white space device may be allowed to preferentially use a current white space during spectrum update usage without performing, thereby effectively implementing intelligentization in a process of updating and using the white space by the white space device, optimizing a spectrum update usage manner, effectively improving service signal quality, and further ensuring working and quality of service of UE. In addition, in this embodiment, in order to avoid transmission of a large quantity of redundancy information between the white space device and a spectrum database device, the spectrum database device only returns indication information related to the current white space when the feature information is determined. In this setting manner, the spectrum database device may be prevented from returning information about another unrelated available white space to the white space device, and only transmits effective response information, thereby improving working performance.

This embodiment further provides a white space device. As shown in FIG. 1, the white space device in this embodiment includes but is not limited to an acquiring module 10, a sending module 11, a receiving module 12, and a configuration processing module 13.

As described above, the acquiring module 10 is configured to acquire feature information of a current white space when the white space device needs to further use the current white space. The acquiring module 10 may be specifically configured to acquire bandwidth and a central frequency that are of the current white space to serve as the feature information.

The sending module 11 is configured to send query request information that includes the feature information acquired by the acquiring module 10 to a spectrum database device, so that the spectrum database device determines whether the current white space corresponding to the feature information is available for further use.

The receiving module 12 is configured to receive response information returned by the spectrum database device according to the query request information sent by the sending module 11.

The configuration processing module 13 is configured to perform corresponding processing according to the response information received by the receiving module 12, so that when the spectrum database device determines that the current white space is available for further use, the configuration processing module 13 configures and uses the current white space according to indication information that is corresponding to the current white space and is included in the response information.

It should be noted that, for a specific working process and an implementation manner of the white space device in this embodiment, refer to related description of the foregoing spectrum update usage system, which is not described again within a range in which it is easy for a person skilled in the art to understand with the reference.

According to this embodiment, a white space device may be allowed to preferentially use a current white space during spectrum update usage without performing switching, thereby effectively implementing intelligentization in a process of updating and using the white space by the white space device, optimizing a spectrum update usage manner, effectively improving service signal quality, and further ensuring working and quality of service of UE.

Further, as shown in FIG. 2, the white space device in this embodiment may further include a parameter identification module 14, where the parameter identification module 14 is configured to combine the feature information and a predetermined character string, that is, may combine the feature information and the predetermined character string into a field that can be read and identified and is used for determining. Correspondingly, the sending module 11 is specifically configured to send the query request information to the spectrum database device after the parameter identification module 14 combines the feature information and the predetermined character string into the field, so that the spectrum database device reads, from the field that includes the predetermined character string, the feature information carried in the field, and determines, according to the feature information, whether a corresponding white space is available for further use.

The configuration processing module 13 is further specifically configured to: when the spectrum database device determines that the current white space is unavailable for further use and determines that another available white space exists, configure and use the another available white space according to spectrum information that is corresponding to the another available white space and is included in the response information; when the spectrum database device determines that the current white space is unavailable for further use and determines that no other available white space exists, stop, according to unavailability prompt information included in the response information, configuring and using the white space.

In a specific application, the white space device may be a base station and/or an AP. The sending module 11 is further specifically configured to send, to the spectrum database device, the query request information that includes at least one of a device serial number, a device type, an antenna characteristic, information about a geographic location in which the device is located, device owner information, and device capability information that are corresponding to the white space device.

It should be noted that, for a specific working process and a principle of the white space device in this embodiment, refer to related description in the foregoing embodiments, which is not described again within a range in which it is easy for a person skilled in the art to understand with the reference.

The white space device in this embodiment acquires feature information of a current white space that is currently used, and sends the feature information to a spectrum database device, so that when querying a white space that is stored and managed, the spectrum database device can determine whether a white space specified in the feature information carried by a field that includes a predetermined character string is available for further use by the white space device, thereby effectively avoiding a case in which the white space device needs to switch to using a different white space, where the case may be caused due to that the spectrum database device randomly returns an available white space. In addition, in this embodiment, in order to avoid transmission of a large quantity of redundancy information between the white space device and the spectrum database device, the spectrum database device only returns indication information related to the current white space when the feature information is determined. In this setting manner, the spectrum database device may be prevented from returning information about another unrelated available white space to the white space device, and only transmits effective response information, thereby improving working performance.

Figure 3:
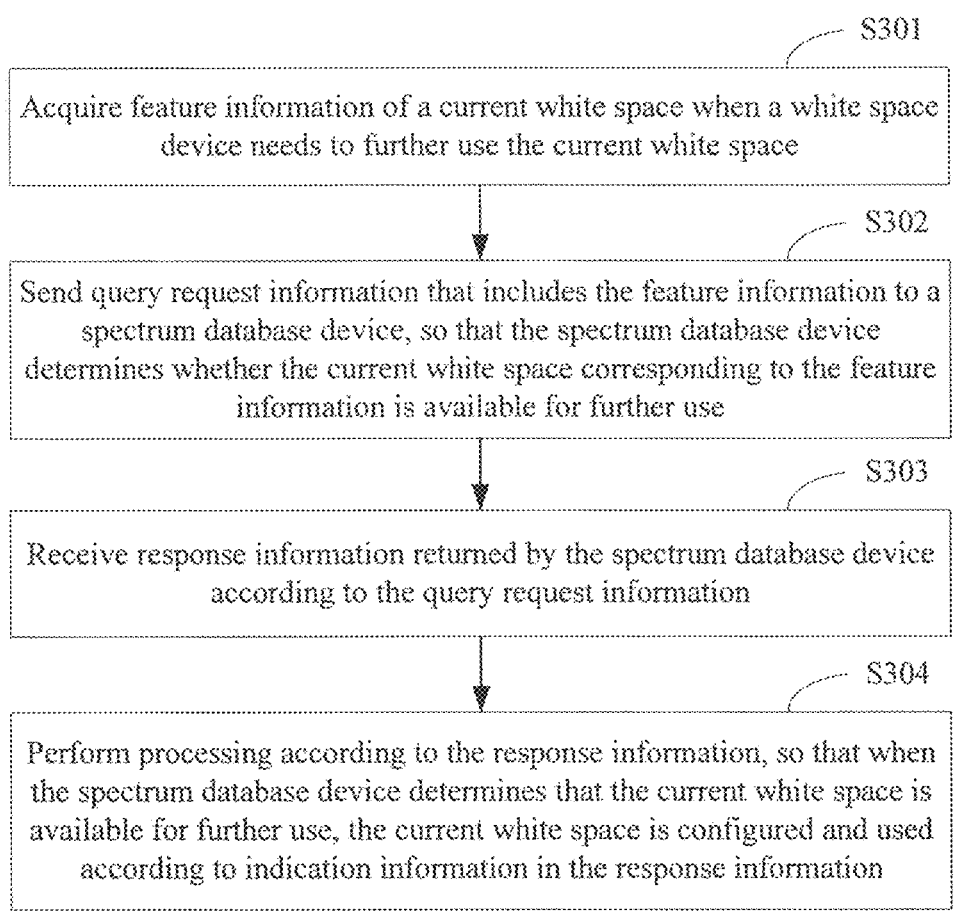
FIG. 3 is a schematic flowchart of an embodiment of a spectrum update usage method according to an embodiment of the present invention.

Refer to FIG. 3 with reference to the foregoing embodiments. FIG. 3 is a schematic flowchart of an embodiment of a spectrum update usage method according to the present invention. An execution body of the spectrum update usage method in this embodiment may be the white space device described in the foregoing embodiments, or certainly may be another device that performs white space management and usage, which is not limited herein.

The spectrum update usage method in this embodiment includes but is not limited to the following steps:

Step S301: Acquire feature information of a current white space when a white space device needs to further use the current white space.

In step S301, the white space device may be configured to provide, by configuring and using a white space, a wireless access service for user equipment such as a mobile phone, a tablet computer, a palmtop computer, a wireless microphone, and/or a walkie talkie that may work, provide a service, or the like by using a wireless connection, so as to establish a cellular network, a wireless local area network, bandwidth access, and the like. The white space device may be specifically a base station, an AP, or the like, which is not limited herein. As described above, a spectrum resource allocated by a spectrum management organization for television signal transmission or the like may be used in a time period within a regional range, and in a next or another time period, the spectrum resource may be re-allocated for the television signal transmission or the like for instant use. Therefore, the white space device cannot occupy a white space in the long term, and in this case, the white space device performs white space querying on the spectrum database device regularly or irregularly, so as to obtain a white space that is allowed (that is, authorized) to be used to work.

It should be noted that, in step S301, bandwidth and a central frequency that are of a current white space currently used by the base station or the AP to provide the wireless access service or the like are acquired as feature information, or bandwidth, a central frequency, and transmit power may be acquired as feature information, which is not limited within a range in which a person skilled in the art can understand.

Step S302: Send query request information that includes the feature information to a spectrum database device, so that the spectrum database device determines whether the current white space corresponding to the feature information is available for further use.

In step S302, the query request information may only include the feature information, or may include specific information corresponding to the white space device, such as a device serial number, a device type, a usage time period, required bandwidth, and/or a transmission distance. Specifically, the white space device may perform choosing according to whether there is sufficient bandwidth between the white space device and the spectrum database device, whether a signal connection therebetween is stable, and/or the like; for example, if there is no sufficient bandwidth, an amount of data in the query request information is reduced as far as possible, and if there is sufficient bandwidth, the amount of the data in the query request information may be increased. It should be understood that, in this embodiment, on the premise that performance stability is ensured and normal working is not affected, the amount of the data in the query request information may be intelligently set, which is not described in detail herein.

Step S303: Receive response information returned by the spectrum database device according to the query request information.

In step S303, the spectrum database device obtains a determining result after determining whether the current white space is available for further use, and generates the response information according to the determining result, where the determining result may include "the current white space is available for further use and it is determined that another available white space exists", "the current white space is available for further use and it is determined that no other available white space exists", "the current white space is unavailable for further use and it is determined that another available white space exists", "the current white space is unavailable for further use and it is determined that no other available white space exists", or the like. Correspondingly, when the determining result is "the current white space is available for further use and it is determined that another available white space exists" or "the current white space is available for further use and it is determined that no other available white space exists", the response information received by the white space device may include indication information (such as "available", "YES", or "allowed") corresponding to the current white space; when the determining result is "the current white space is unavailable for further use and it is determined that another available white space exists", the response information may include spectrum information (such as "unavailable, and whether to perform switching", "NO, and whether to perform switching", or "a white space allowed to be used is xxx") corresponding to the another available white space; when the determining result is "the current white space is unavailable for further use and it is determined that no other available white space exists", the response information may include unavailability prompt information (that is, there is no available white space), or the like. The response information may also include a list of effective white spaces and effective time of the white spaces for the white space device to perform intelligent and automatic choosing, which is not described in detail herein.

Step S304: Perform processing according to the response information, so that when the spectrum database device determines that the current white space is available for further use, the current white space is configured and used according to indication information in the response information.

Specifically, in step S304, the white space device may configure and use the current white space according to indication information (such as "available", "YES", or "allowed") that is corresponding to the current white space and is included in the response information; switch to using another available white space according to spectrum information (such as "unavailable, and whether to perform switching", "NO, and whether to perform switching", or "a white space allowed to be used includes ABC") corresponding to the another available white space; or perform standby according to the unavailability prompt information (that is, there is no available white space); and in a preset time period (such as an update cycle), the white space device performs again a processing process such as spectrum querying on the spectrum database device. That is, the "processing" may include: when the spectrum database device determines that the current white space is available for further use, the white space device configures and uses the current white space according to the indication information that is corresponding to the current white space and is included in the response information; the "corresponding processing" may include switching to using another available white space; or the "corresponding processing" may be performing standby in the case of the "unavailability prompt information", and performing again, by the white space device in a preset time period (such as an update cycle), a process such as spectrum update querying on the spectrum database device, which is not limited herein.

It should be noted that, in this embodiment, after the spectrum database device performs determining, if the determining result includes "the current white space is available for further use", the indication information (such as "available", "YES", or "allowed") and the like to be returned in the response information needs to be specified, so that the white space device further preferably configures and uses the current white space according to the indication information. In this manner, this embodiment can effectively avoid a case in which query conditions are the same, but white space lists obtained by two queries are different, where the case is caused due to that the white space device uses an existing update usage method. When the white space device determines that the current white space is available for further use, a process of the "configuring and using" may be re-activating, configuring, and using the current white space, or may be keeping a current operating status of the white space device without performing processes such as activation and configuration, which further ensures that a case such as interruption or pulse interference does not occur when the UE uses the wireless service.

According to this embodiment, a white space device may be allowed to preferentially use a current white space during spectrum update usage without performing switching, thereby effectively implementing intelligentization in a process of updating and using the white space by the white space device, optimizing a spectrum update usage manner, effectively improving service signal quality, and further ensuring working and quality of service of UE.

Figure 4:
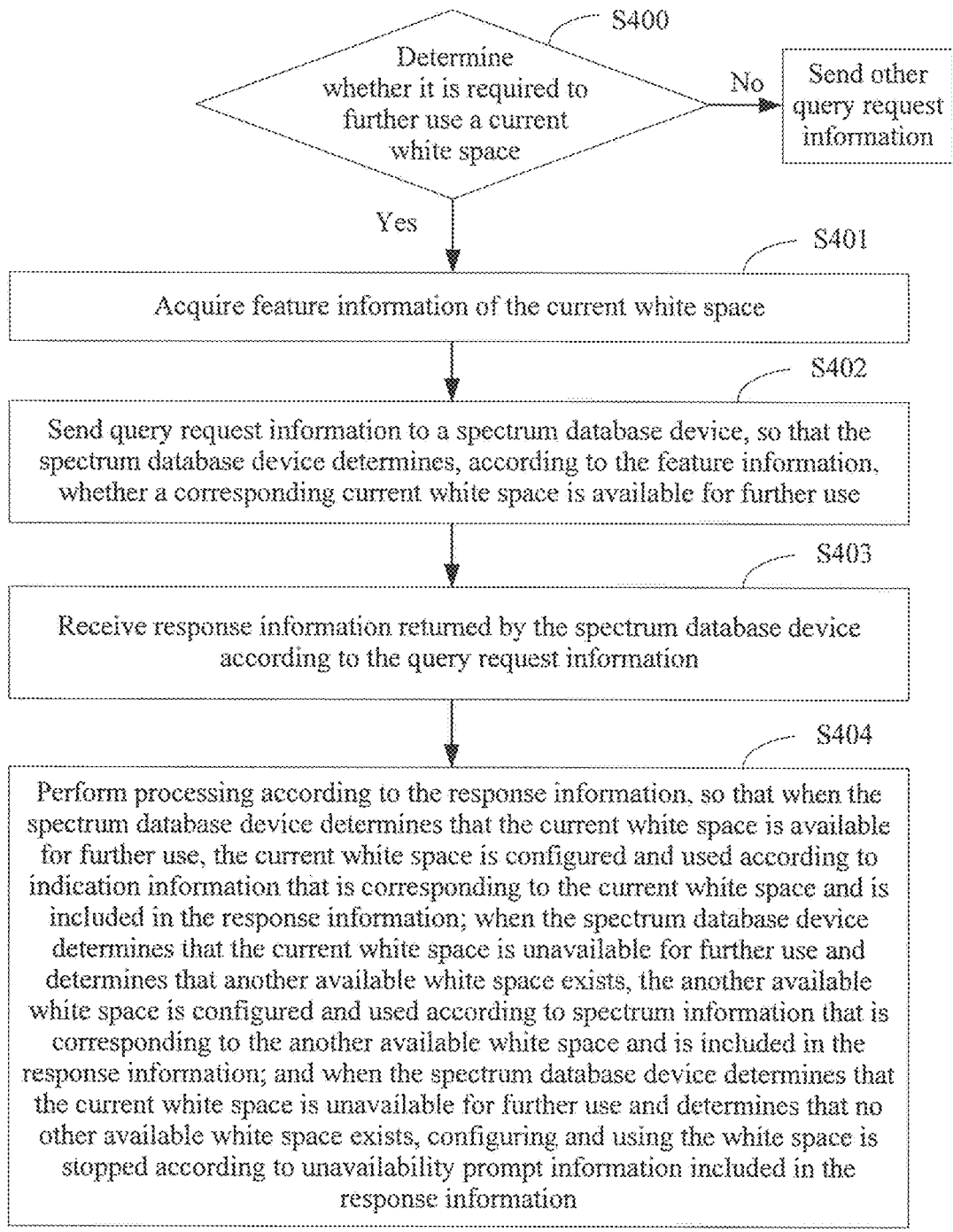
FIG. 4 is a schematic flowchart of another embodiment of a spectrum update usage method according to an embodiment of the present invention.

Refer to FIG. 4 with reference to related description of the foregoing embodiments. FIG. 4 is a schematic flowchart of another embodiment of a spectrum update usage method according to the present invention. An execution body of the spectrum update usage method in this embodiment may be the white space device shown in FIG. 1 or FIG. 2, or may be another device that performs white space management and usage, which is not limited herein.

The spectrum update usage method in this embodiment includes but is not limited to the following several steps:

Step S400: Determine whether it is required to further use a current white space. When a determining result is "yes", step S401 is executed; and when the determining result is "no", other query request information is sent, where the other query request information may include one or any combination of a device serial number, a device type, an antenna characteristic, information about a geographic location in which the device is located, device owner information, and device capability information that are corresponding to the white space device, which is not limited within a range in which a person skilled in the art can understand.

It should be noted that, in step S400, the white space device may be set by default to determine, each time when needing to perform white space querying on a spectrum database device, whether it is required to further use the current white space to acquire feature information; the white space device may determine, according to a current operating status of the white space device, whether it is required to further use the current white space; for example, if the operating status of the white space device is good (for example, there is sufficient bandwidth between the white space device and the spectrum database device and/or a signal connection therebetween is stable), and a case such as congestion or operating speed reduction is not caused due to that the spectrum database device returns a large quantity of redundancy information, the white space device determines that it is not required to further use the current white space and further the feature information does not need to be acquired. Further, if a quantity of UEs that use a wireless service provided by the white space device is relatively small in some time periods (such as from 3 to 5 a.m.), and usage operations, such as communication and accessing a network, performed by the UE are not affected when the white space device updates and uses the white space and switches to using another white space, the white space device may also determine, according to the time periods, that the feature information does not need to be acquired.

Step S401: Acquire feature information of the current white space.

In step S401, when the white space device is a base station or an AP, the white space device correspondingly acquires bandwidth and a central frequency that are of a current white space currently used by the base station or the AP to provide a wireless access service or the like to serve as feature information, or may acquire bandwidth, a central frequency, and transmit power to serve as feature information. In this embodiment, the feature information and a predetermined character string may be combined into a field that can be read and identified and is used for determining. The predetermined character string in this embodiment may be preferred_ws, for_ws, or the like, which is not limited herein, as long as the predetermined character string is registered and defined in advance in the spectrum database device and can be identified by the spectrum database device.

Step S402: Send query request information to a spectrum database device, so that the spectrum database device determines, according to the feature information, whether a corresponding current white space is available for further use.

By using the PAWS protocol, the white space device may send the query request information to the spectrum database device to perform white space querying. Specifically, a character string of the query request information may include AVAIL_SPECTRUM_REQ and the like, which may be specifically set according to pre-registration with and pre-definition in the spectrum database device, and details are not described herein again.

Step S403: Receive response information returned by the spectrum database device according to the query request information.

In step S403, the spectrum database device may return indication information (such as "available", "YES", or "allowed") corresponding to the current white space, spectrum information (such as "unavailable, and whether to perform switching", "NO, and whether to perform switching", or "a white space allowed to be used is ABC") corresponding to another available white space, or unavailability prompt information (that is, there is no available white space) according to a determining result such as "the current white space is available for further use and it is determined that another available white space exists", "the current white space is available for further use and it is determined that no other available white space exists", "the current white space is unavailable for further use and it is determined that another available white space exists", or "the current white space is unavailable for further use and it is determined that no other available white space exists", which is not limited within a range in which a person skilled in the art can understand.

Step S404: Perform processing according to the response information, so that when the spectrum database device determines that the current white space is available for further use, the current white space is configured and used according to indication information that is corresponding to the current white space and is included in the response information; when the spectrum database device determines that the current white space is unavailable for further use and determines that another available white space exists, the another available white space is configured and used according to spectrum information that is corresponding to the another available white space and is included in the response information; and when the spectrum database device determines that the current white space is unavailable for further use and determines that no other available white space exists, configuring and using the white space is stopped according to unavailability prompt information included in the response information.

In step S404, if the indication information (such as "available", "YES", or "allowed") or the like is returned in the response information, the white space device further preferably configures and uses the current white space according to the indication information. A process of the "configuring and using" may be re-activating, configuring, and using the current white space, or may be keeping a current operating status of the white space device without performing processes such as activation and configuration, which further ensures that a case such as interruption or pulse interference does not occur when the UE uses the wireless service.

Further, in order to avoid transmission of a large quantity of redundancy information between the white space device and the spectrum database device, when determining that feature information of a predetermined character string code exists in the query request information, the spectrum database device in this embodiment may only return indication information related to the current white space, for example, return, to the white space device, at least one of the bandwidth, the central frequency, and transmit power that are of the current white space, or at least one of bandwidth, a central frequency, and transmit power that are of a set using the current white space as a subset. It is not hard to see that, in this setting manner, the spectrum database device may be prevented from sending information about another unrelated available white space to the white space device, and only transmits effective response information, thereby improving working performance.

When the white space device determines that at least one of the bandwidth and the central frequency that are of the current white space exists in the response information, or at least one of the bandwidth and the central frequency that are of the current white space is included in at least one of bandwidth and a central frequency that are returned in the response information, it is considered by default that the white space device may further use the current white space, so as to perform related processing.

According to this embodiment, a white space device may be allowed to preferentially use a current white space during spectrum update usage without performing switching, thereby effectively implementing intelligentization in a process of updating and using the white space by the white space device, optimizing a spectrum update usage manner, effectively improving service signal quality, and further ensuring working and quality of service of UE.

Figure 5:
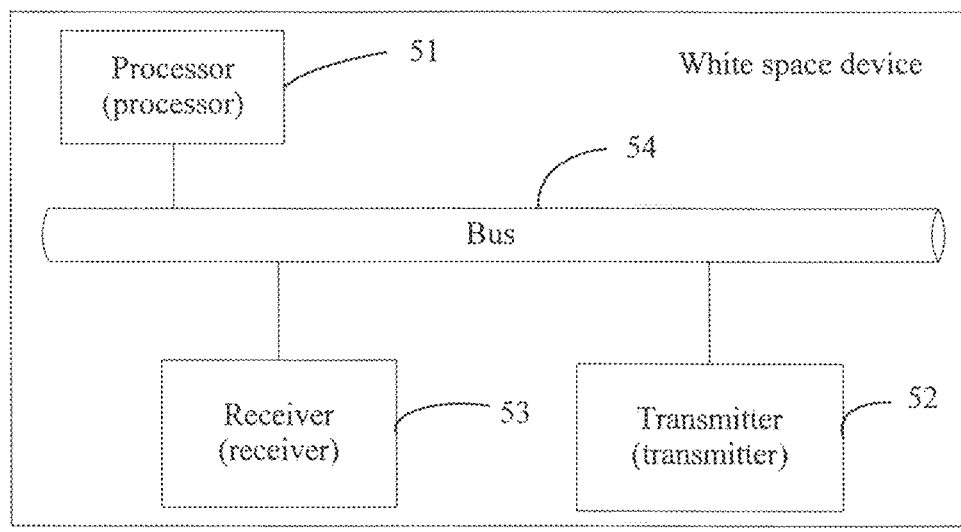
FIG. 5 is a module block diagram of a specific embodiment of a white space device according to an embodiment of the present invention.

Refer to FIG. 5 with reference to the foregoing embodiments. FIG. 5 is a module block diagram of a specific embodiment of a white space device according to the present invention. The white space device in this embodiment includes but is not limited to a processor 51, a transmitter 52, a receiver 53, and a bus 54. The processor 51 is connected to the transmitter 52 and the receiver 53 separately by using the bus 54.

The white space device in this embodiment includes but is not limited to following specific working processes.

The processor 51 is configured to acquire feature information of a current white space when the white space device needs to further use the current white space.

The transmitter 52 is configured to send query request information that includes the feature information acquired by the processor 51 to a spectrum database device, so that the spectrum database device determines whether the current white space corresponding to the feature information is available for further use.

The receiver 53 is configured to receive response information returned by the spectrum database device according to the query request information sent by the transmitter 52.

Then, the processor 51 is further configured to perform corresponding processing according to the response information received by the receiver 53, so that when the spectrum database device determines that the current white space is available for further use, the processor 51 configures and uses the current white space according to indication information that is corresponding to the current white space and is included in the response information.

It should be noted that, the processor 51 is further configured to combine the feature information and a predetermined character string, that is, may combine the feature information and the predetermined character string into a field that can be read and identified by the spectrum database device and is used for determining. Correspondingly, the transmitter 52 is specifically configured to send the query request information to the spectrum database device after the processor 51 combines the feature information and the predetermined character string, so that the spectrum database device identifies the carried feature information from the field that includes the predetermined character string, and determines whether the current white space corresponding to the feature information is available for further use. The processor 51 performs different processing according to different determining results. For example, when the spectrum database device determines that the current white space is unavailable for further use and determines that another available white space exists, the processor 51 configures and uses the another available white space according to spectrum information that is corresponding to the another available white space and is included in the response information; and when the spectrum database device determines that the current white space is unavailable for further use and determines that no other available white space exists, the processor 51 may stop, according to unavailability prompt information included in the response information, configuring and using the white space.

As described above, the white space device in this embodiment includes a base station and an AP. That is, the processor 51 may be specifically configured to acquire bandwidth and a central frequency that are of the current white space to serve as the feature information.

According to the foregoing process, this embodiment implements intelligentization in a process of updating and using the white space by a white space device, optimizes a spectrum update usage manner, and effectively improves service signal quality of the white space device.

According to this embodiment, the White space device may be allowed to preferentially use the current white space during spectrum update usage without performing switching, thereby effectively implementing intelligentization in a process of updating and using the white space by the white space device, optimizing a spectrum update usage manner, effectively improving service signal quality, and further ensuring working and quality of service of UE.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A method implemented by an access device for updating a white space spectrum, the method comprising:
   acquiring, by the access device, feature information of the white space spectrum during communication, by the access device, using the white space spectrum with a terminal, wherein the feature information comprises information about a bandwidth and a central frequency of the white space spectrum;
   combining, by the access device, the feature information and a predetermined character string into a field of an update request;
   sending, by the access device, the update request to a spectrum database device, wherein the update request further comprises one or more of an access device serial number, an access device type, an access device antenna characteristic, access device owner information, or access device capability information;
   receiving, by the access device, a response to the update request from the spectrum database device based on:
      the spectrum database device identifying the feature information according to the predetermined character string, and
      the spectrum database device determining an availability of the white space spectrum; and
   communicating, by the access device, with the terminal using the white space spectrum identified by the feature information upon determining the response for the update request indicates that the white space spectrum is available.

2. The method according to claim 1, further comprising:
   communicating, by the access device, with the terminal using another white space spectrum when the response for the update request indicates that the other white space spectrum is available.

3. The method according to claim 1, further comprising:
   communicating, by the access device, with the terminal using a spectrum that excludes the white space spectrum when the response for the update request indicates that the white space spectrum is not available.

4. The method according to claim 1, wherein:
   the response for the update request comprises indication information for the white space spectrum identified by the feature information; and
   the response for the update request comprises no indication information for another available white space spectrum for the access device.

5. The method according to claim 1, wherein the update request further comprises location information indicating a geographic location of the access device.

6. An access device, comprising:
   a processor configured to:
      acquire feature information of a white space spectrum during communication, by the access device, using the white space spectrum with a terminal, wherein the feature information comprises information about a bandwidth and a central frequency of the white space spectrum,
      combine the feature information and a predetermined character string into a field of an update request, and
      support communication with the terminal using the white space spectrum identified in the feature information when a response to the update request indicates that the white space spectrum is available;
   a transmitter configured to send the update request to a spectrum database device, wherein the update request further comprises one or more of an access device serial number, an access device type, an access device antenna characteristic, access device owner information, or access device capability information;
   a receiver configured to receive the response to the update request from the spectrum database device based on:
      the spectrum database device identifying the feature information according to the predetermined character string, and
      the spectrum database device determining an availability of the white space spectrum.

7. The access device according to claim 6, wherein the processor is further configured to support communications with the terminal using another white space spectrum when the response for the update request indicates that the other white space spectrum is available.

8. The access device according to claim 6, wherein the processor is further configured to support communications with the terminal using a spectrum that excludes the white space spectrum when the response for the update request indicates that the white space spectrum is not available.

9. The access device according to claim 6, wherein the response for the update request comprises:
   indication information for the white space spectrum identified by the feature information; and no indication information for another available white space spectrum for the access device.

10. The access device according to claim 6, wherein the update request further comprises location information indicating a geographic location of the access device.

11. A communication system, comprising:

an access device configured to:
  acquire feature information of a white space spectrum during communication between the access device and a terminal for communicating with a terminal, wherein the feature information comprises information about a bandwidth and a central frequency of the white space spectrum,
  combine the feature information and a predetermined character string into a field of an update request,
  send the update request to a spectrum database device, wherein the update request further comprises one or more of an access device serial number, an access device type, an access device antenna characteristic, access device owner information, or access device capability information,
  receive a response to the update request from the spectrum database device, and
  communicate with the terminal using the white space spectrum identified by the feature information when the response to the update request indicates that the white space spectrum is available; and the spectrum database device is configured to:
  receive the update request from the access device,
  identify the feature information according to the predetermined character string, wherein the predetermined character string is registered and defined in advance in the spectrum database device,
  determine an availability of the white space spectrum, and
  send, to the access device, the response to the update request.

12. The communication system according to claim 11, wherein the access device is configured to communicate with the terminal using another white space spectrum when the response for the update request indicates that the other white space spectrum is available.

13. The communication system according to claim 11, wherein the access device is configured to communicate with the terminal using a spectrum that excludes the white space spectrum when the response for the update request indicates that the white space spectrum is not available.

14. The communication system according to claim 11, wherein the spectrum database device is configured to:
  add indication information for the white space spectrum identified by the feature information into the response for the update request; and
  exclude indication information for another available white space spectrum from the response for the update request.

15. The communication system according to claim 11, wherein the update request further comprises location information indicating a geographic location of the access device.

* * * * *